Figure 2:
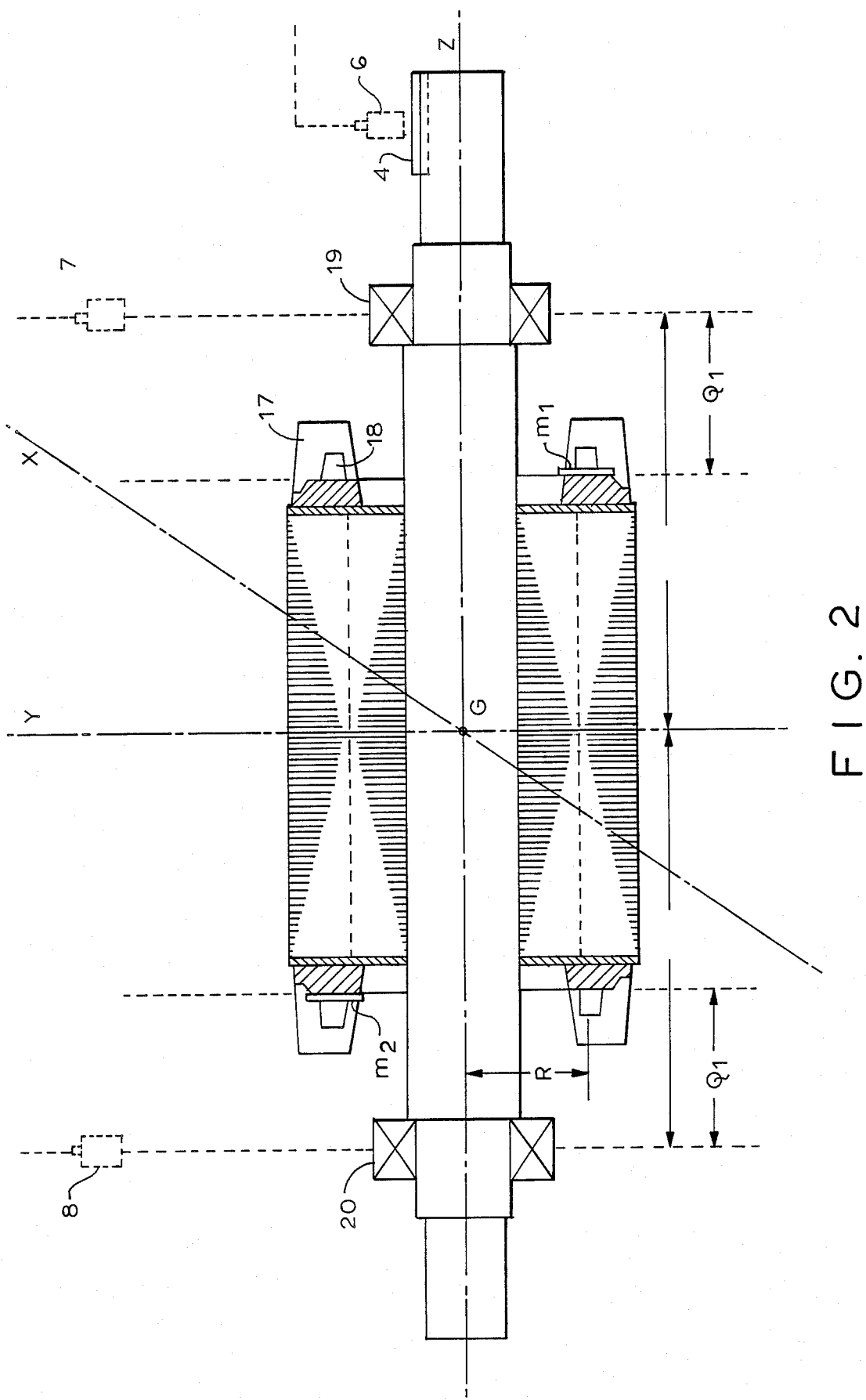

United States Patent [19]

Iliev

[11] Patent Number: 4,608,867
[45] Date of Patent: Sep. 2, 1986

[54] METHOD FOR THE DYNAMIC BALANCING OF ROTATING MACHINES IN ASSEMBLED CONDITION

[75] Inventor: Ivan S. Iliev, Sofia, Bulgaria

[73] Assignee: I E P "N. Belopitov", Sofia, Bulgaria

[21] Appl. No.: 710,135

[22] Filed: Mar. 11, 1985

[30] Foreign Application Priority Data

Mar. 9, 1984 [BG] Bulgaria .................................. 64580

[51] Int. Cl.$^4$ ............................................. G01M 1/22
[52] U.S. Cl. ...................................................... 73/462
[58] Field of Search .................. 73/462, 460, 471, 475, 73/477, 479

[56] References Cited

U.S. PATENT DOCUMENTS

| 2,349,450 | 5/1944 | Meinzer | 73/471 |
| 2,399,255 | 4/1946 | Rouy | 73/475 |
| 4,098,127 | 7/1978 | Shiga et al. | 73/462 |

OTHER PUBLICATIONS

Dynamic Force Measuring System for Machinery Vibration with Particular Application to Balancing of Assembled Machines, T. W. Barraclough et al., Aug. 1959, The Journal of the Acoustical Society of America, vol. 31, No. 8.

Primary Examiner—Stephen A. Kreitman
Assistant Examiner—Scott M. Oldham

[57] ABSTRACT

Method of dynamic balancing of rotating machines in assembled condition, the machines being symmetrical to their center of weight. The effective value of the speed of radial vibrations arising from unbalance when the machine is running at no-load speed and is vibro-isolated from the surrounding media are measured by measuring the relative acceleration phases of the vibrations. Correction masses are estimated for each balancing plane by dividing the measured effective speed values by a constant characterizing the machines of a given type, which is determined beforehand. When the machine is dismantled, correction masses are placed in the balancing planes at angles obtained from the determined relative acceleration phases plus 270° they added along the directional rotation of the rotor of the machine. These angles are measured according to a mark on the shaft of the machine. The radial vibrations are measured by means of sensors for vibrational acceleration, the signals from said sensors bein transmitted to an integrator, respective filters, respective amplifiers, and a measuring device and then to a phase comparing device. The angles are determined by means of the same sensors and by means of another photoelectric, electromagnetic, or magnetelectric sensor and its signal is transmitted to a filter, an amplifier, and measuring device and then to the same phase comparing device. The method of the invention can be performed by use of no more than one dismantling of the machine, thus resulting in a shorter time of performing the method with a smaller consumption of energy and this expense.

1 Claim, 2 Drawing Figures

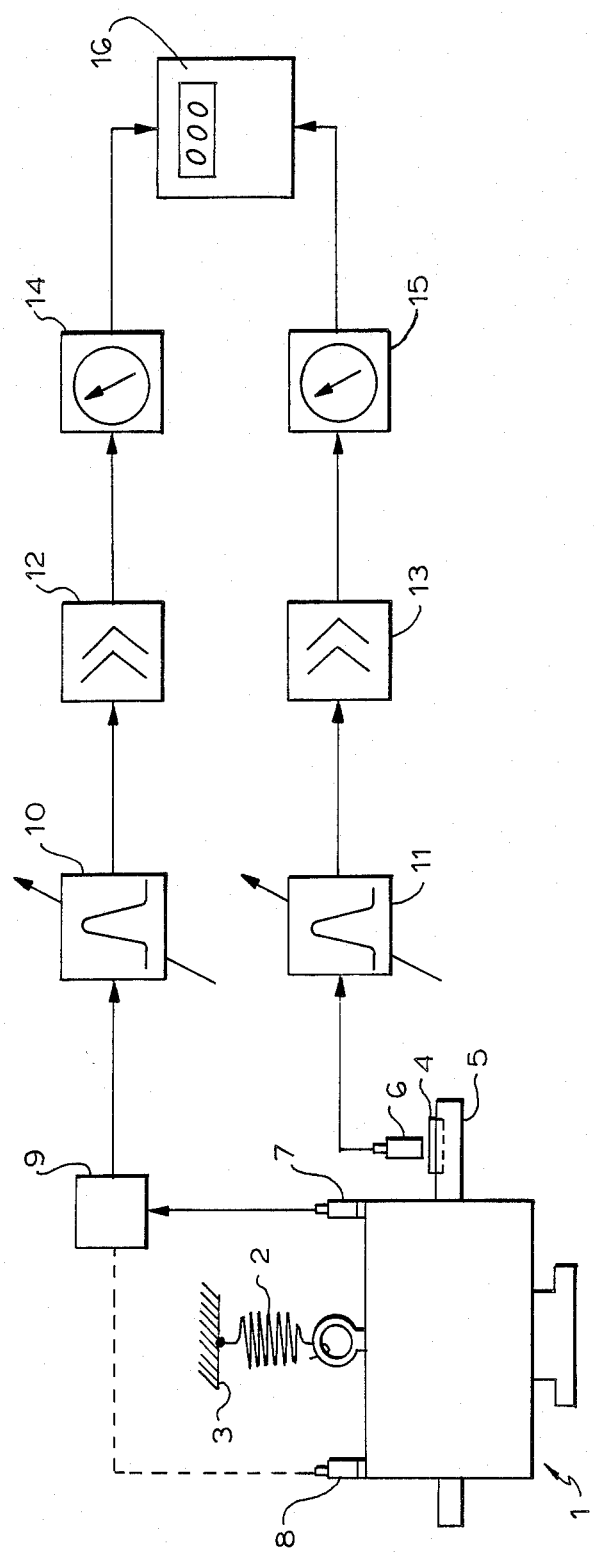
F I G. 1

METHOD FOR THE DYNAMIC BALANCING OF ROTATING MACHINES IN ASSEMBLED CONDITION

This invention relates to a method for the dynamic balancing of already assembled rotating machines, symmetrical with respect to the center of weight of the machines. Said method can be used for the production and adjustment of said machines.

A method of dynamic balancing of rotating machines in assembled condition is already known; in accordance with said known method, the effective values and relative speed phases of the radial vibrations caused by unbalance are measured successively in the planes of the two bearings of the machine such as a motor or generator. After that, the machine is dismantled and a test extra mass of appropriately chosen size is put at a randomly closen place in the first balancing plane. The machine is then assembled and the effective values and the relative speed phases of the radial vibrations caused by unbalance are measured again in the two bearing planes. Then the machine is dismantled for a second time, and the additional test mass is taken away. A new test additional test mass with an appropriately chosen size is placed in the second balance plane. The machine is assembled for a second time, and for the third time there are measured the effective values and the relative speed phases of the radial vibrations caused by unbalance in the two planes of the bearings. With the aid of a provisional program of dynamic balancing and a computer, the necessary correction masses and relatives angles are determined. After the machine has been dismantled for the third time, the estimated correction masses are placed at the estimated relative angles which are placed according to a reference mark upon the shaft. After a third assembly of the machine, the effective values of the speed of radial vibrations caused by unbalance in the planes of the two bearings are measured. The last measurement is a control one, which is performed to check the result of the balancing operation.

A shortcoming of this method is that with rotating machines having parts symmetrical with respect to the center of weight, it is necessary four times to measure the effective values and relative phases of the speed of radial vibration caused by unbalancing, and also it is necessary to dismantle and assemble the machine three times, which in itself is a waste of time, power and testing mechanisms.

The invention has among its objects the provision of a method of dynamic balancing of rotating machines in assembled condition, symmetrical with respect to the center of weight thereof, whereby the balancing can be done with a smaller number of dismantling and assembling operations, with a shorter time and a smaller consumption of energy than is possible with previously known methods.

Said object is achieved by means of a method of dynamic balancing of rotating machines in assembled condition, symmetrical to the center of weight, whereby in the planes of the two bearings of the machines there are successively measured the effective values of the speed of the radial vibrations caused by the unbalance when the machine is in its no-load running condition and is vibro-isolated from the surrounding media. After that, in the planes of the two bearings there are successively measured the relative phases of the acceleration of the radial vibrations caused by unbalancing. Correction masses are estimated separately for each balance plane by means of dividing the measured effective values of the speed of radial vibrations caused by unbalancing, by a constant value characteristic of the machine, said constant value being determined by the speed of rotation of the machine, the mass of the machine, the two main inertia moments of the machine and its rotor, the distance from the center of weight of the machine to the planes of the two bearings and to the balancing planes, and the distance from the axis to the rotor to the place of putting on the correction masses.

The machine is dismantled, and in the planes of balancing there are placed the estimated correction masses at angles obtained by the respective values of the relative phases of acceleration of the radial vibrations caused by unbalance measured in the plane of the nearer bearing plus 270° in the direction of rotation of the rotor. The angles are measured according to a mark or a known location such as a key on the machine shaft. The machine is assembled, and a control measurement of the effective values of the radial vibration caused by unbalances is taken to check the results of the balancing operation.

According to this method, it is possible for balancing of rotating machines symmetrical to the center of weight in assembled condition to be performed with only one dismantling and one reassembling of the machine. Moreover, the effective value of the speed of radial vibrations caused by unbalance is measured only twice instead of four times, while the relative phases of acceleration of the radial vibrations caused by unbalance are measured instead of being estimated. In order to determine the correction masses and their locations, it not necessary to make use of a computer or to make a program before hand. The smaller number of dismantling and assembling steps, as well as the lack of complex estimation, leads to economy of time, mechanisms employed, and energy.

The method according to the invention is clearly shown in the accompanying drawings, wherein:

FIG. 1 is a drawing illustrating the principle of the device by means of which the balancing of rotating machines according to the invention is achieved, and FIG. 2 is a view partially in axial section and partially in side elevation of the rotor of an electric motor to be balanced in accordance with the method illustrated in FIG. 1.

As shown in FIG. 1, the rotating machine, an electric motor 1, is hung on a coil tension spring 2, by means of which vibroisolation of the machine from the surrounding media is achieved, said spring being hung on a massive immovable support 3. Above a key 4 on the working end of shaft 5 of the motor, an inductive contactless sensor 6 is disposed, while on the body of the electric motor, in the planes of its two bearings, there are radially placed two piezoelectric sensors 7 and 8 which detect the acceleration of vibrations in the planes of their respective locations. Sensors 6, 7 and 8 are so placed that the axes of their greatest sensitivity lie in one and the same plane; said plane intersects the axis of rotation of the motor; in this case it is a vertical plane. The piezoelectrical sensors 7 and 8 are selectively and successively connected to an integrating device 9 which integrates acceleration into speed. In the drawing, it is indicated that sensor 7 is connected to integrating device 9; following that sensor 7 is disconnected from integrating device 9, and sensor 8 is then connected to integrating device 9 as indicated by the dash line. Integrating device 9 and the inductive sensor 6 are connected, respectively, with frequency filters 10 and 11. The outputs of the filters 10 and 11 are connected with amplifiers 12 and 13, respectively, and thence to measuring devices 14 and 15, also respectively. The outputs of devices 14 and 15 are connected to the inputs of a phase-comparing device 16.

As shown in FIG. 2, planes sigma$_1$ ($\sigma_1$) and sigma$_2$ ($\sigma_2$) of the bearings, symmetrical with respect to the center of weight G of electric motor 1, are placed at a distance a$_1$ from the balancing planes sigma$_3$ ($\sigma_3$) and sigma$_4$ ($\sigma_4$) at a distance l$_1$ from the center of weight G. Between the ventilator fans 17 at each end of the rotor there are butts 18 where the correction masses m$_1$ and m$_2$ are positioned at a distance R from the axis of the rotor. Axis Y is parallel to the directions of measuring the radial vibrations caused by unbalance of the rotor of the electric motor 1.

The balancing operation according to the method of the invention is performed as follows:

A preparatory work is done: The output of the piezoelectrical sensor 7 is connected with the integral device 9, which works at a vibrating speed. Electric motor 1 is rotating under a no-load condition. The frequency filters 10 and 11 adapted to the frequency of rotation of electric motor 1.

According to the method, by means of filter 10, amplifier 12 and measuring device 14 and then successively switching the signals from sensor 7 to those from sensor 8, and vice versa, in the planes of the two bearings sigma$_1$ ($\sigma_1$) and sigma$_2$ ($\sigma_2$), there are measured the effective values of the speeds of radial vibrations resulting from unbalance, V$_1$ and V$_2$, respectively, in radial directions parallel to the axis Z. After that, the integrating device 9 is again switched to vibrational acceleration and the relative phases alpha$_1$ ($\alpha_1$) and alpha$_2$ ($\alpha_2$) of the acceleration of radial vibrations caused by unbalance, are successively measured. This is first done in plane sigma$_1$ ($\sigma_1$) of bearing 19 with the aid of sensor 7 and sensor 6, and then in plane sigma$_2$ of bearing 20 with the aid of sensor 8 and again sensor 6. The results from such measurements are obtained from the phase comparing device 16 by means of which there is obtained the phase-difference between the sinusoidal value of the radial acceleration (obtained from sensor 7, respectively, sensor 8) and the periodic impulses with the frequency of rotation which is that of key 4 (the mark on the shaft of the motor), obtained from sensor 6. The relative phases alpha$_1$ ($\alpha_1$), alpha$_2$ ($\alpha_2$) measured are considered to be the relative phases of centrifugal forces which cause unbalance in balance planes sigma$_3$ and sigma$_4$. Thus, the relative speeds V$_1$ and V$_2$ are divided by the constant P characterizing the electric motor 1 and is obtained by the formula:

$$P = \frac{W_o \cdot R}{\sqrt{2}} \frac{1}{M} + \left[ \frac{(l_1 - a_1)l_1}{I_1 - I_3} \right]$$

Wherein:

$W_o = 2nf_o$ is the rotation speed of the rotor ($f_o$ is the rotation speed of the rotor in Hz),
M is the machine mass in kg,
I$_1$ is main central inertia moment of the machine according to the axis X or Y in kg.m$^2$,
I$_3$ is the main inertial moment of the machine according to axis Z in kg.m$^2$,
R is the radial distance from the rotor axis to the planes of the correction masses in m$_1$, m$_2$,
l$_2$ is the distance from the center of weight of the machine to the respective planes of the two bearings of a machine, and
a$_1$ is the distance between the planes of the balancing weights m$_1$, m$_2$ and the plane of the bearing nearer to it (FIG. 2).

The electric motor 1 is dismantled and in the two balancing planes sigma$_3$ ($\sigma_3$) and sigma$_4$ ($\sigma_4$) at certain places—butts 18, there are placed upon the rotor the estimated correction masses m$_1$, m$_2$, respectively, at angles gamma$_1$ ($\gamma_1$) = alpha$_1$ ($\alpha_1$) + 270°, gamma$_2$ ($\gamma_2$) = alpha$_2$ ($\alpha_2$) + 270° measured along the direction of rotor rotation according to a mark (not shown on the figures) on the shaft of electric motor 1. By adding 270° there is taken into consideration the relative phase of the maximum sinusoidal acceleration of the radial vibrations from unbalance (added 90°), and also the necessity that the balancing should be done in anti-phase of the unbalancing (added 180° more). Finally, electric motor 1 is assembled and again the relative value of the speeds V$_1$ and V$_2$ of radial vibrations are measured. The last two are compared with the values of permissible vibrations. In the case that the obtained values of vibrations do not fall within permissible ranges, the whole testing and adjusting balancing procedure is repeated.

Although the invention is described and illustrated with reference to a single embodiment thereof, it is to be expressly understood that it is in no way limiting to the disclosure of such preferred embodiments but is capable of numerous modifications within the scope of the appended claims.

We claim:

1. In a method of dynamic balancing of rotating machines in assembled condition, said machine being symmetrical with respect to the center of weight, said method including successively measuring the effective values of the speed of radial vibrations of the machine caused by unbalance in the balancing planes of the two bearings of the machine, determining the correction masses for each balancing plane, dismantling the machine and placing the respective correction masses in the two balancing planes at angles measured from a mark on the shaft of the machine, then assembling the machine and taking a control measurement of the effective value of the radial vibrations of the machine with the machine running at a predetermined no-load speed, the improvement which comprises before measuring the effective values of the speed of radial vibrations the machine is vibro-isolated from the surrounding media after that successively measuring in the planes of the two bearings of the machines the relative phases of acceleration of radial vibrations caused by unbalance, determining correction masses for each balancing plane by dividing the effective values of the speed of radial vibration caused by unbalance by a constant obtained from the speed of rotation of the machine, the mass of the machine, the main inertia moment of the machine at its rotor, the distance between the center of weight of the machine and planes of the two bearings, the distance between the center of weight of the machine and the balancing planes, and the distance from the axis of the rotor to the places of mounting the second correction masses, said second correction masses being placed at angles obtained from the relative phases of acceleration are of radial vibrations caused by unbalance, measured in the planes of their respective bearings, with the addition 270° along the direction of rotation of the rotor.

* * * * *